US006801325B2

United States Patent
Farr et al.

(10) Patent No.: US 6,801,325 B2
(45) Date of Patent: Oct. 5, 2004

(54) METHOD AND DEVICES FOR INSPECTING AND CALIBRATING OF STEREOSCOPIC ENDOSCOPES

(75) Inventors: Mina Farr, Palo Alto, CA (US); Alan Petersen, Cupertino, CA (US)

(73) Assignee: Intuitive Surgical, Inc., Sunnyvale, CA (US)

( * ) Notice: Subject to any disclaimer, the term of this patent is extended or adjusted under 35 U.S.C. 154(b) by 230 days.

(21) Appl. No.: 10/183,976

(22) Filed: Jun. 25, 2002

(65) Prior Publication Data

US 2003/0234940 A1 Dec. 25, 2003

(51) Int. Cl.[7] .............................. G01B 9/02; A61B 1/00; A61B 1/05
(52) U.S. Cl. ..................... 356/520; 600/117; 600/111
(58) Field of Search ........................... 356/520; 348/45, 348/65; 600/111, 117, 160, 166

(56) References Cited

U.S. PATENT DOCUMENTS

| | | | |
|---|---|---|---|
| 4,723,843 A | 2/1988 | Zobel | |
| 4,903,133 A | 2/1990 | Hiltebrandt | |
| 4,969,708 A | 11/1990 | Leiner | |
| 5,078,503 A | 1/1992 | Ueda | |
| 5,270,792 A | * 12/1993 | Snyder | ................. 356/520 |
| 5,355,218 A | * 10/1994 | Matsuda et al. | ............ 356/520 |
| 5,459,605 A | 10/1995 | Kempf | |
| 5,527,263 A | 6/1996 | Zobel et al. | |
| 5,568,312 A | 10/1996 | Horton | |
| 5,588,948 A | 12/1996 | Takahashi et al. | |
| 5,720,706 A | 2/1998 | Takahashi et al. | |
| 5,743,846 A | 4/1998 | Takahashi et al. | |
| 5,743,847 A | 4/1998 | Nakamura et al. | |
| 5,764,809 A | 6/1998 | Nomami et al. | |
| 5,776,049 A | 7/1998 | Takahashi | |
| 5,842,972 A | 12/1998 | Wulfsberg | |
| 5,852,511 A | 12/1998 | Tateyama et al. | |
| 5,860,912 A | 1/1999 | Chiba | |
| 5,861,987 A | 1/1999 | Nakamura et al. | |
| 5,912,764 A | 6/1999 | Togino | |
| 5,956,179 A | 9/1999 | Shichman | |
| 5,980,453 A | 11/1999 | Forkey et al. | |
| 6,049,422 A | 4/2000 | Ibe | |

* cited by examiner

Primary Examiner—Frank G. Font
Assistant Examiner—Michael A. Lyons
(74) Attorney, Agent, or Firm—Townsend and Townsend and Crew LLP (57) ABSTRACT

Methods and devices for inspecting and calibrating a stereoscopic imaging device, such as a binocular endoscope. In one exemplary embodiment, the method of the present invention measures a fringe pattern from light emitted through two channels of the device. An angle of each of the fringe pattern can be measured so as to allow a diopter difference between the channels to be calculated.

44 Claims, 7 Drawing Sheets

METHOD AND DEVICES FOR INSPECTING AND CALIBRATING OF STEREOSCOPIC ENDOSCOPES

CROSS-REFERENCES TO RELATED APPLICATIONS

The present application is related to Provisional Patent Application Ser. No. 60/176,101, filed Jan. 14, 2000, U.S. patent application Ser. No. 09/680,922, filed Oct. 6, 2000, U.S. patent application Ser. No. 09/689,444, filed Oct. 12, 2000, and PCT Patent Application Ser. No. 01/00927, filed Jan. 12, 2001, the complete disclosure of which are incorporated herein by reference.

BACKGROUND OF THE INVENTION

The present invention is generally related to testing and calibrating optical devices, such as those used for minimally invasive surgery. In particular, the present invention is related to methods and devices for inspecting and calibrating a stereoscopic endoscope.

Minimally invasive medical techniques are aimed at reducing the amount of extraneous tissue which is damaged during diagnostic or surgical procedures, thereby reducing patient recovery time, discomfort, and deleterious side effects. The average length of a hospital stay for a standard surgery is significantly longer than the average length for the equivalent surgery performed in a minimally invasive surgical manner. Patient recovery times, patient discomfort, surgical side effects, and time away from work are also reduced with minimally invasive surgery.

The most common form of minimally invasive surgery may be endoscopy. Probably the most common form of endoscopy is laparoscopy, which is minimally invasive inspection and surgery inside the abdominal cavity. In standard laparoscopic surgery, a patient's abdomen is insufflated with gas, and cannula sleeves are passed through small (approximately ½ inch) incisions to provide entry ports for laparoscopic surgical instruments.

The laparoscopic surgical instruments generally include a laparoscope for viewing the surgical field, and working tools defining end effectors. To perform surgical procedures, the surgeon passes these working tools or instruments through cannula sleeves to a desired internal surgical site and manipulates the tools from outside the abdomen. The surgeon often monitors the procedure by means of a television monitor which displays an image of the surgical site via the laparoscopic camera. Similar endoscopic techniques are employed in, e.g., arthroscopy, retroperitoneoscopy, pelviscopy, nephroscopy, cystoscopy, cisternoscopy, sinoscopy, hysteroscopy, urethroscopy, and the like.

Minimally invasive telesurgical systems are now being developed to increase a surgeon's dexterity, so that the surgeon performs the surgical procedures on the patient by manipulating master control devices to control the motion of servomechanically operated instruments. In such a telesurgery system, the surgeon is again provided with an image of the surgical site via an endoscope. In both telesurgical and manual endoscopic procedures, the endoscope may optionally provide the surgeon with a stereoscopic image to increase the surgeon's ability to sense three-dimensional information regarding the tissue and procedure.

When imaging a target site with stereoscopic imaging optics, it is of particular importance to have very accurate adjustments between the stereo channels to provide accurate three dimensional information that can be matched between the two channels. If accurate matching is not accomplished, the stereo viewer will provide an inaccurate image and may cause eye strain for the user.

Consequently, it would be desirable to provide methods and devices which can inspect and calibrate a stereoscopic imaging device so as to be able to determine how well matched a first channel is compared with a second channel.

BRIEF SUMMARY OF THE INVENTION

The present invention relates generally to testing and calibrating stereoscopic imaging devices, such as a stereoscopic endoscope.

In particular, the present invention provides methods and devices for inspecting an optical endoscope assembly to ensure that a first and second channel are properly focused. The methods of the present invention can be used during quality control checks after manufacturing, by end users prior to performing surgery, or by technicians that service the endoscopes to ensure the that left and right channels of the stereoscopic endoscope are properly focused.

In some embodiments, the methods and devices of the present invention can make use of a generated fringe pattern that provides information about the diopter difference between two channels of the optical endoscopes. In exemplary configurations, the fringe pattern is generated by a shear plate that reflects a light beam exiting one of the channels of the endoscope and reflects the light beam onto an imaging device. The reflected light off of a front surface and a back surface of the shear plate create a constructive and destructive interference which lead to a series of light and dark fringes or a series of straight line segments. Measurement of the angle of the straight line segments, and a comparison of the angles from a first channel and a second channel of the endoscope provides information regarding the diopter difference between the first and second channels.

Once the diopter difference is measured, the user can determine if maintenance or replacement is needed. In general, if the diopter difference between the first channel and second channel is less than approximately ±0.2 diopters, the endoscope will not require maintenance or replacement. It should be appreciated however, that an acceptable diopter difference between other stereoscopic imaging channels will vary depending on the type of stereoscopic imaging device, the use of the stereoscopic device, and the like.

In one aspect, the present invention provides a method of calibrating a first channel and a second channel of a stereoscopic imaging device. The method comprises comparing an angle of a straight line segment of a fringe pattern obtained from the first channel with an angle of a straight line segment of a fringe pattern obtained from the second channel to determine an angle difference between the first channel and second channel. Thereafter, the angle difference can be used to calculate a diopter difference between the first and second channel.

In exemplary configurations, the fringe pattern of the first and second channels is obtained by delivering a laser beam through the channel and reflecting the laser beam after it exits the channel off of a shear plate so as to create the fringe pattern. Thereafter, the angle of the straight line segment of the fringe pattern of the channels can be measured.

In another aspect, the present invention provides a method for calibrating a stereoscopic endoscope. The method includes a step of providing a stereoscopic endoscope comprising a first channel and a second channel. The first channel and second channel each include a first end and a second end. A laser beam is delivered into the first ends of the of the first and/or second channel so as to emit light through at least one of the second ends of the first channel and second channel. The light that exits the second end of the first channel and the second channel can be reflected off of a fringe pattern device, (e.g., a shear plate). The fringe pattern device can create two beams of light that create a fringe pattern comprising straight line segments. An angle of the straight line segments for the first channel and second channel can be measured and the measured angle of the First channel and the second channel is calculated to determine a diopter difference between the first channel and the second channel.

In a further aspect, the present invention provides a method of calibrating a stereoscopic imaging device. The method includes a step of obtaining a fringe pattern for the first imaging channel. An angle of a straight line segment of the fringe pattern for the first imaging channel is calculated. A fringe pattern for the second imaging channel is obtained and an angle for a straight line segment of the fringe pattern for the second imaging channel is calculated. The angles of the first imaging channel and second imaging channel are compared and a diopter difference between the first imaging channel and the second imaging channel from the comparison of the angles is calculated.

In yet another aspect, the present invention provides a system for calibrating a stereoscopic imaging device. The system comprises a stereoscopic imaging device having a first channel that has a first end, a second end, and an optical assembly between the first end and the second end. The stereoscopic imaging device also includes a second channel comprising a first end, a second end, and an optical assembly between the first end and the second end. A laser that generates a laser beam along an optical axis is positioned so that the laser beam enters at least one of the first ends of the first channel and second channel and is emitted through the optical assemblies. At least one compensator lens is positioned adjacent the second end of the first channel and right channel such that the compensator lens collimates diverging light that exits the second ends of the channels. At least one shear plate is positioned to receive the collimated light after it exits the compensator lens. The shear plate creates for the first channel and second channel an interference fringe pattern having straight line segments that define an angle that varies with a diopter of the optical assemblies of the first channel and second channel. A difference in the angles of the straight line segments of the first channel and second channel is used to calculate a diopter mismatch between the first channel and second channel.

In another aspect, the present invention provides a device for calibrating a stereoscopic endoscope. The device includes a stereoscopic endoscope having a first channel and a second channel. A laser source is positioned to deliver a laser beam along an optical axis and into at least one of the first channel and second channel. A fringe pattern device that can generate a fringe pattern from light that exits the first channel and second channel. An image device captures at least one image of the fringe patterns. A controller assembly is in communication with the image device and is configured to calculate an angle of the fringe pattern, determine an angle difference of the fringe patterns, and determine a diopter difference between the first channel and second channel using the angle difference.

In yet another aspect, the present invention provides a kit for focus matching a first channel and a second channel of a stereoscopic imaging device. The kit comprises a laser source that generates a laser beam and a shear plate that reflects light exiting at least one of the first channel and second channel and creates a fringe pattern from the reflected light from the first channel and second channel. The kit further includes a camera that can obtain an image of the fringe patterns for the first channel and second channel and a computer system that compares the angles of the fringe patterns of the first channel and second channel and calculates a diopter difference between the first channel and the second channel.

For a further understanding of the nature and advantages of the invention, reference should be made to the following description taken in conjunction with the accompanying drawings.

DETAILED DESCRIPTION OF THE INVENTION

Figure 1A:
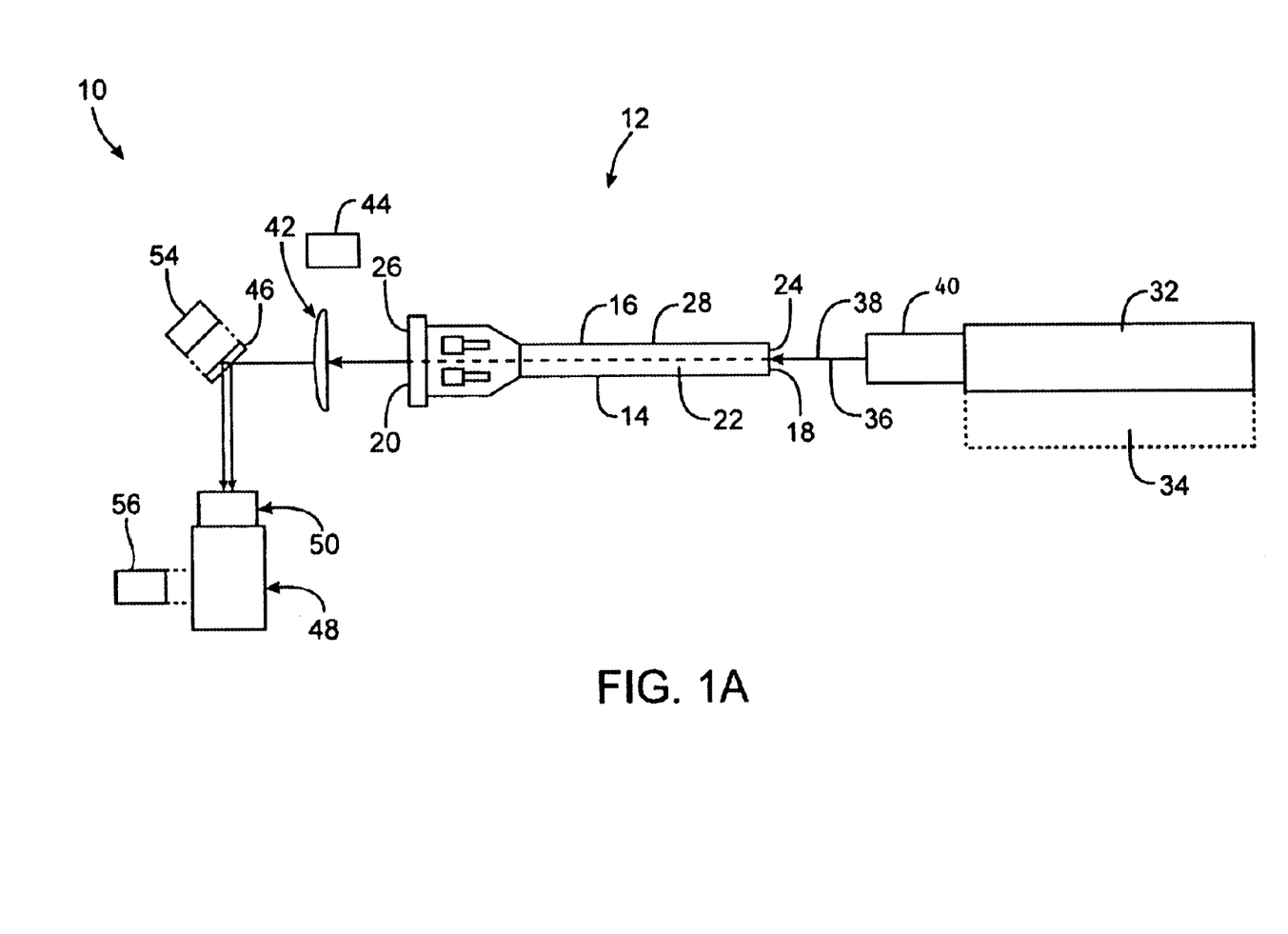
FIG. 1A is a schematic plan view of one system of the present invention.
Figure 1B:
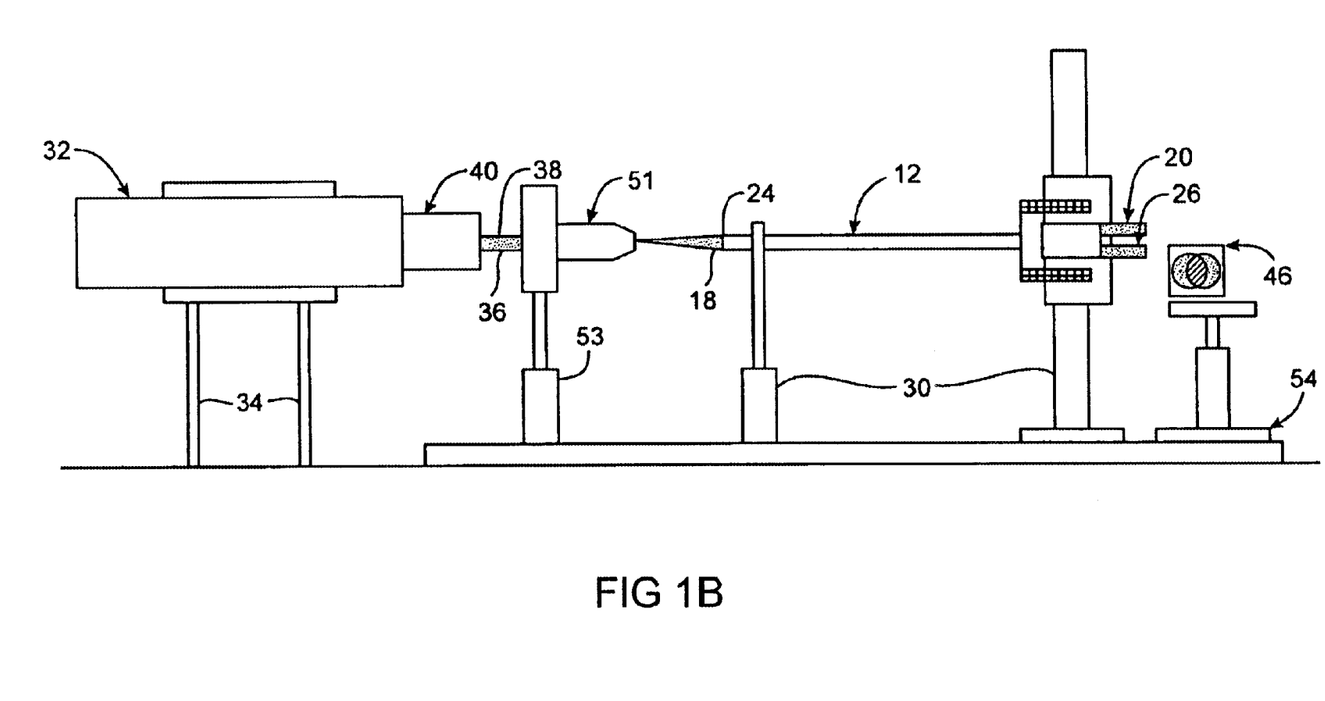
FIG. 1B is an elevational view of another system of the present invention including an optional microscope objective lens assembly.

FIGS. 1A and 1B illustrate some exemplary systems 10 of the present invention. System 10 includes a stereoscopic endoscope 12 that has a right channel 14 and a left channel 16. Right channel 14 has a first end 18, a second end 20, and an optical assembly 22 positioned between the first end and the second end. Similarly, left channel 16 has a first end 24, a second end 26, and an optical assembly 28 positioned between the first end and the second end. One exemplary stereoscopic endoscope of the present invention is described more fully in U.S. patent application Ser. No. 09/689,444, filed Oct. 12, 2000, the complete disclosure of which is incorporated herein by reference.

Endoscope 12 can be coupled to an endoscope carriage or stand 30 to stabilize and position the endoscope. A laser source 32 can be positioned on a stand 34 adjacent the first end 18, 24 of the left and right channels so as to deliver a laser beam 36 of collimated light along an optical axis 38 and into at least one of the left and right channels 14, 16. Laser source 32 generally generates a visible laser beam (e.g., red colored laser beam). In one configuration, the laser beam has a wavelength of approximately 633 nm.

In one configuration, a beam expander 40 can be positioned in the optical axis 38 of the laser beam so that laser beam 36 is expanded to a size such that the laser beam is simultaneously delivered into both left and right channels 14, 16.

Beam expander 40 is typically positioned between approximately 20 mm and 200 mm, and preferably about 60 mm from the first end of the left channel and right channels.

It should be appreciated however that the spacing between beam expander 40 and the ends of the channels does not effect the calibration.

In one exemplary embodiment, beam expander 40 expands the laser beam ten times. It should be appreciated however, that the beam expander can expand the laser beam by any magnification and the level of magnification will depend on the type of laser, the size of the endoscope, and the like.

As the laser beam enters the first end of the channel(s) 14, 16, the light rays will be parallel. Optical chains 22, 28 will generally act like a negative lens and will cause the light rays of the laser to diverge. To compensate for the diverging light rays, a positive compensator lens 42 can be positioned with a lens stand 44 in the path of the exiting light rays. Compensator lens 42 can be used to bring the diverging light rays back into parallel arrangement. For example, if the optical chains act like a −0.8 diopter lens, compensator lens 42 will be a ±0.8 diopter positive lens so as to collimate the exiting light.

In one exemplary embodiment, compensator lens 42 will be positioned between 10 mm and 100 mm, and preferably about 70 mm from the second end of channels 14, 16. The spacing between compensator lens 42 and the second end of the channels allows room for the user to move the endoscope, etc. The distance generally does not effect the measurements performed. In some embodiments, compensator lens 42 will be large enough to simultaneously relay the light rays that exit from both channels 14, 16. In other embodiments, however, compensator lens 42 will be sized to relay light rays from only one channel.

In the system illustrated in FIG. 1B, a microscope objective lens 51 or another lens assembly can optionally be positioned on adjustable or nonadjustable stand 53 so as to generate an even larger laser spot size.

As shown in FIG. 1A, the light rays exiting compensator lens 42 will be parallel and will be reflected off of a shear plate 46. Shear plate 46 is an optical arrangement having non-parallel surfaces that can cause a constructive and destructive interference between the light rays so as to create a series of light and dark fringes that correspond to in phase and out of phase portions of the light rays. One exemplary shear plate of the present invention has a diameter of 0.5 inches and a wedge angle of 2 minutes ±30 seconds and is sold as part number WPW-0508-C, which is custom manufactured by the CVI Laser Corporation.

In exemplary methods, during calibration of shear plate 46, compensator lens 42 can be removed out of the path of the laser light and the angle difference with and without the compensator lens 42 can be measured. Based on the angle difference, the shear plate is then known to have a given angle change in the fringe pattern for the diopter change.

In an exemplary embodiment shown most clearly in FIG. 1A, shear plate 46 is positioned at a 45° degree angle from optical axis 38 of laser beam 36 as it exits a second end of a left or right channel. Shear plate 46 can reflect laser beam 36 to create a fringe pattern that can be captured by a camera 48, in which the angle of the lines in the pattern is a function of the diopters of the optical path. The angle difference of the fringe lines of the left channel relative to the right channel is a measure of a focus mismatch between the two channels.

In some embodiments, shear plate 46 is fixed in position. In other embodiments, shear plate 46 is movable. In such embodiments, shear plate 46 generally is movable in a direction that is orthogonal to the optical axis of the laser beam, and possibly along the optical axis.

As illustrated, shear plate 46 is generally positioned between approximately 10 mm and 300 mm, and preferably approximately 150 mm from the second end of endoscope 12. It should be appreciated however, that the spacing of shear plate 46 and the second end of endoscope does not effect the measurements obtained.

Shear plate can reflect the light rays in an orthogonal direction from its original orientation into a camera 48 that is between approximately 50 mm and 250 mm from the shear plate. It should be appreciated however, that the orientation and spacing of the shear plate 46 and the camera 48 can be varied without departing from the scope of the present invention. As illustrated in FIG. 1A, camera 48 can be a CCD, a black and white CCD (such as a Pulnix Model TM-7CN or TM-6CN), or the like, and can capture an image of the fringe pattern. In some embodiments, camera 48 can include a filter 50, such as a neutral density filter which can reduce the brightness so that the camera is not saturated with ambient light. In exemplary embodiments, the camera does not have a lens because the image from the shear plate is to land on the CCD without any divergence or convergence that may be introduced by the lens on the camera. It should be appreciated however, that filter 50 generally does not introduce any divergence or convergence of light, only attenuation.

A computer 52 can be in communication with camera 48 so as to capture and analyze the images of the fringe pattern for each of the channels that is obtained by camera 48. Computer 52 can be a personal computer (PC) or a processor that is in communication with a personal computer including the standard user interface devices such as a keyboard, a display monitor, and the like. Computer 52 will typically include an input device such as a magnetic or optical disk drive, a CD drive, an internet connection, or the like. Such input devices can be used to download a computer executable code from a computer network or a tangible storage media embodying steps or programming instructions for any of the methods of the present invention. Tangible storage media may take the form of a CD-R, a CD-RW, a floppy disk, an optical disk, a data tape, a non-volatile memory, or the like, and the computer 52 will include the memory boards and other standard components of modern computer systems for storing and executing this code.

In exemplary embodiments, computer system 52 can run a plurality of different software modules, including but not limited to a frame grabbing module that obtains at least one image of the fringe pattern from each of the channels and analyzes the fringe pattern to calculate the angle, and a fringe pattern analysis module that can calculate the angle difference in the fringe patterns and determine the diopter difference between the two channels. It should be appreciated, however, that other combinations of software modules can be used to perform the functions of the present invention.

Figure 2:
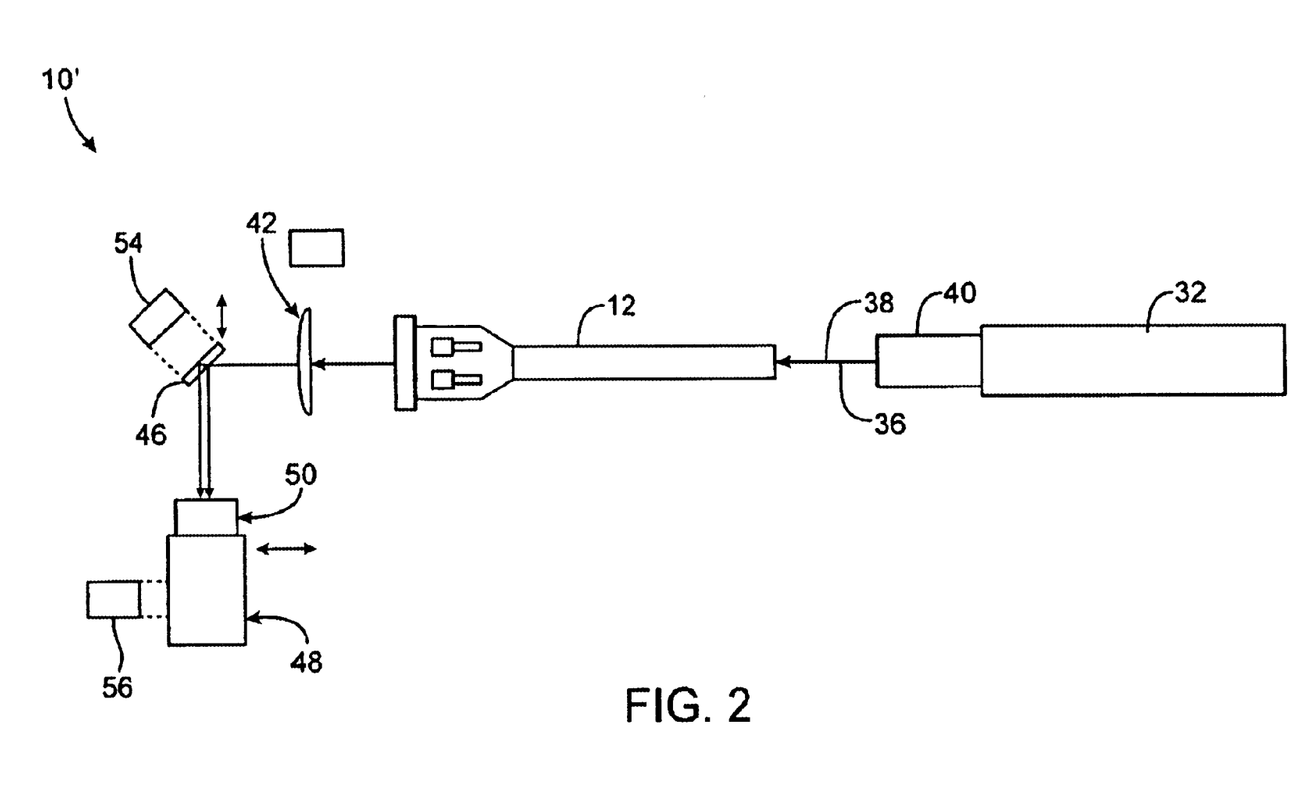
FIG. 2 illustrates one specific embodiment of the present invention that includes a movable camera and movable shear plate.
Figure 3:
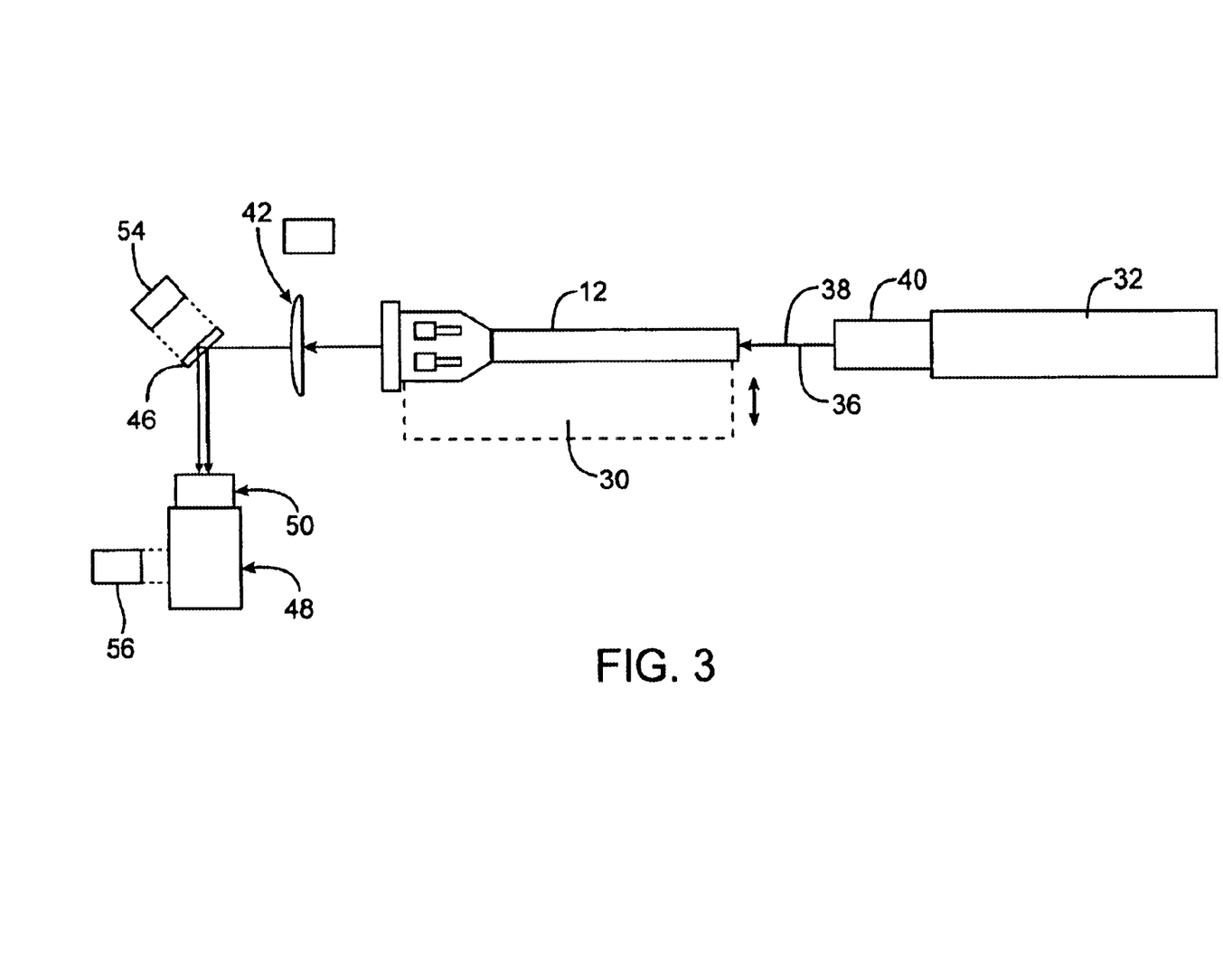
FIG. 3 illustrates another specific embodiment of the present invention that includes a movable endoscope.

FIGS. 2 and 3 illustrate some exemplary embodiments of the present invention. FIG. 2 illustrates one embodiment of a system 10' which includes a shear plate 46 that is coupled to a movable support 54 and a camera 48 that is coupled to a movable support 56. Compensator lens 42 is stationary and will have an aperture that is large enough to pass the laser beams through the second end of both of the right channel and left channel.

In one configuration, supports 54, 56 are movable posts. It should be appreciated, however, that other support devices can be used to move shear plate 46 and camera 48. As shown by the arrows, both shear plate 46 and camera 48 can be moved vertically (or horizontally) to first intercept the laser beam exiting from a first channel. Once the fringe pattern is obtained from the first channel, the shear plate and the camera can be moved to intercept the laser beam exiting from the second channel. Preferably, camera 48 is moved without causing any rotation of the camera.

FIG. 3 illustrates another embodiment 10" in which laser 32, shear plate 46, camera 48, and compensator lens 42 are stationary and endoscope 12 is attached to a movable support 30. Endoscope 12 can be placed in a first position in which right channel 14 is aligned with laser 32, shear plate 46, camera 48, and compensator lens 42, such that the laser beam will be directed through right channel 14 to create a fringe pattern that can be imaged by camera 48. Once the fringe pattern is recorded, endoscope 12 can be moved to a second position in which left channel 16 is aligned with laser 32, shear plate 46, camera 48, and compensator lens 42 such that the laser will be directed through left channel 16 to create a fringe pattern for the left channel. As above, the fringe pattern of left channel 16 can be captured, and the angles of each of the channels can be measured and thereafter compared to determine the diopter mismatch between the left channel and right channel.

Figure 4:
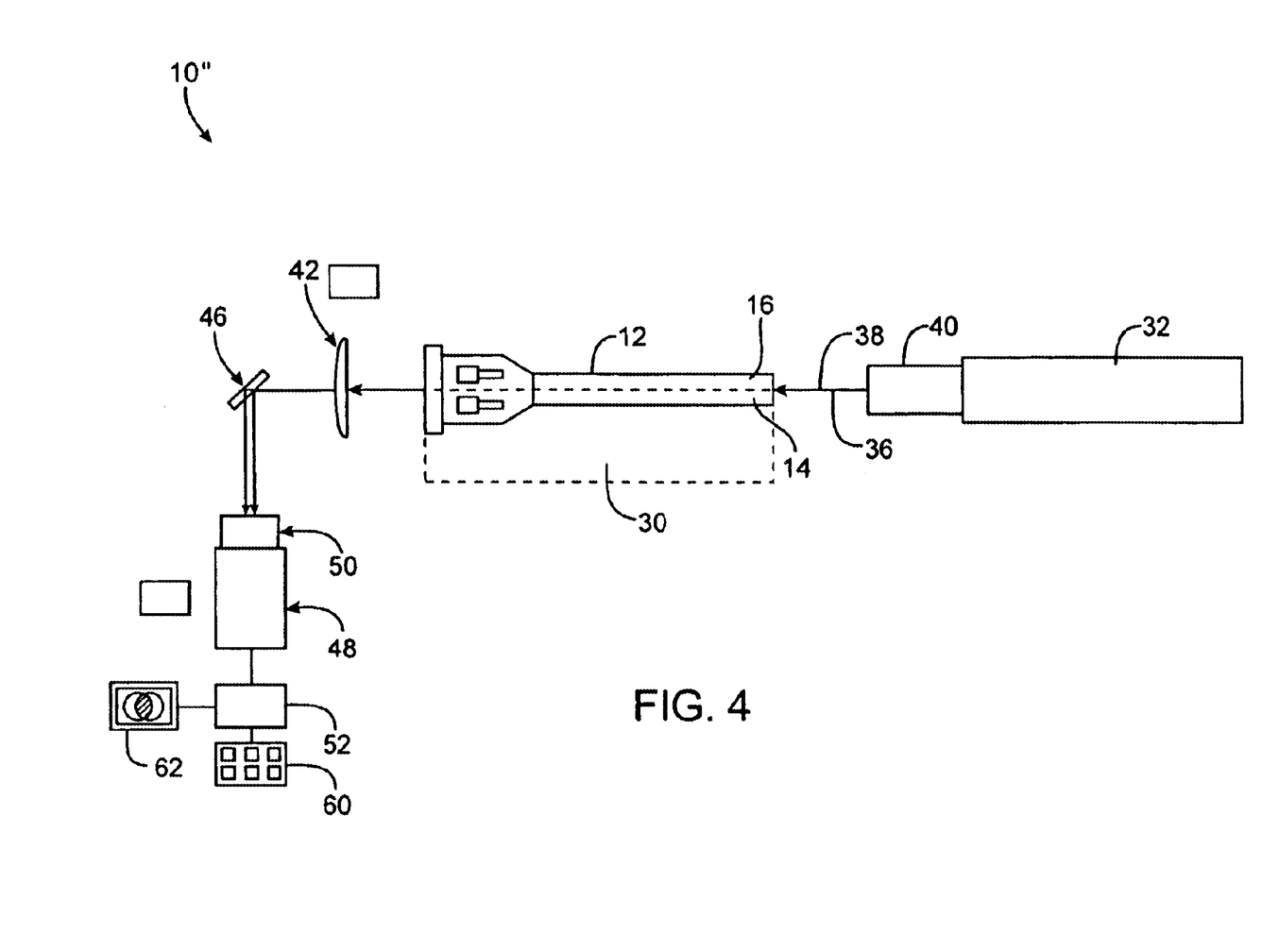
FIG. 4 illustrates an embodiment having dedicated input devices for activating the system of the present invention.

As shown in FIG. 4, in another exemplary embodiment of system 10''', computer system 52 can include dedicated user inputs 60 that allow the user to activate the computer system to perform various functions. For example, computer system 52 can have input devices, such as an "View Output" button, "Get Right Image" button, "Get Left Image" button, "Analyze Images" button, "Save Results" button, and the like. Such buttons can be used to instruct the computer to activate the software modules of the present invention. It should be appreciated, however, that in alternative embodiments, such buttons can be software icons that can be displayed on the user output device 62 (e.g., computer monitor) and actuated with a cursor on the output device.

For example, activating the "View Output" button may show on a user output device 62 an image of the fringe pattern that is produced. If the fringe pattern is unacceptable (e.g., misaligned with the camera, or the like), the user can adjust the position or orientation of at least some of the components of the system until an acceptable fringe pattern is displayed. Once the fringe pattern is acceptable, the user can activate a "Get Left Image" button to activate the software to capture the fringe pattern of the left channel and to compute an angle of a central portion of the fringe pattern. Thereafter, the user can adjust the position of some of the components of the system (as described above in relation to FIGS. 2 and 3) until an acceptable alignment of the right channel 14 is achieved. Such adjustments can be done manually by the user or automatically with computer 52. Thereafter, the user can activate the "Get Right Image" button to capture an image of the fringe pattern of the right channel and to compute an angle of the central portion of the fringe pattern. Finally, the user can activate the "Analyze Images" button to instruct the computer to calculate an angle difference between the left channel and right channel fringe patterns and to compute a Diopters Difference between the two channels. If the Diopters Differences is between approximately ±0.2 Diopters, the endoscope "passes" and no adjustments will generally be required. Once the Diopters Difference has been calculated, the user can activate the "Save Results" button to save the calculations to memory.

Figure 5:
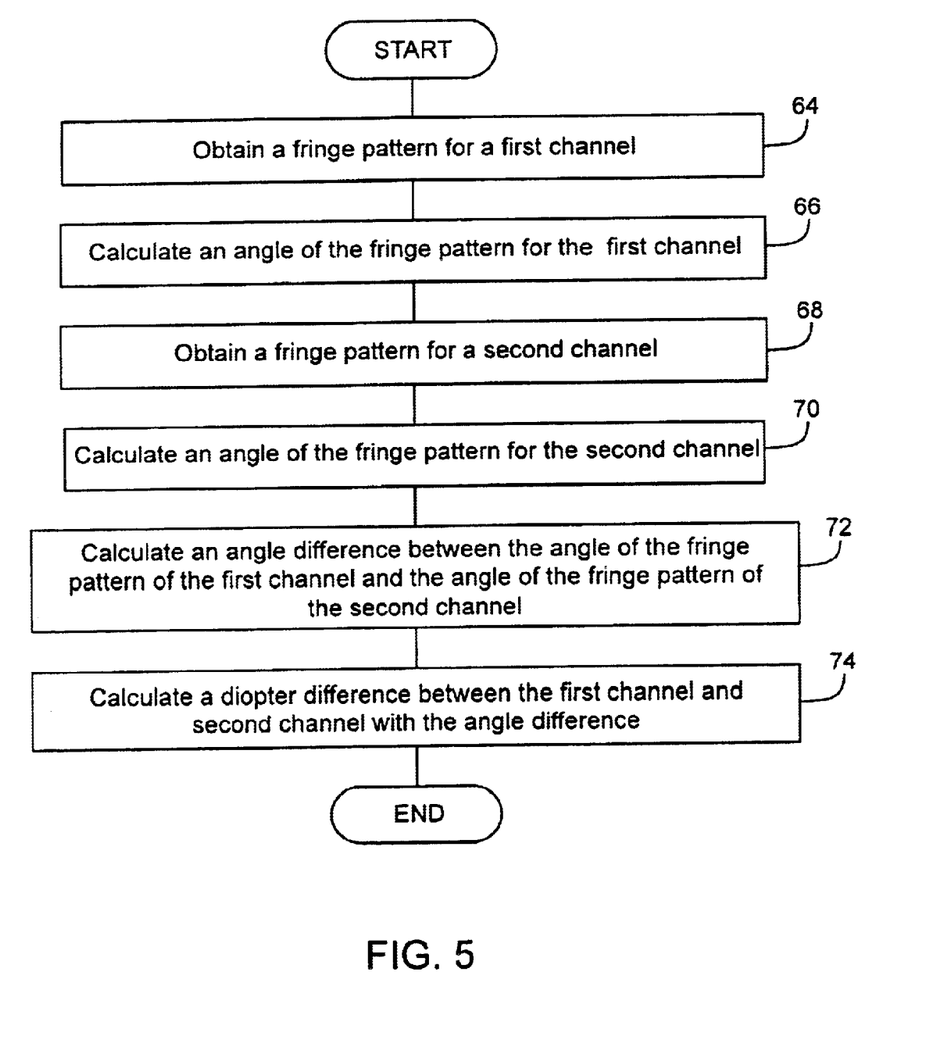
FIG. 5 schematically illustrates a method of the present invention.

Some methods of the present invention will now be described. One method of the present invention is schematically illustrated in FIG. 5. Generally, a fringe pattern is obtained for a first channel. (Step 64). Typically, the fringe pattern is obtained by directing a laser beam through the first channel, reflecting the laser beam off of a shear plate or other fringe pattern generator and onto an imaging device. An angle of the fringe pattern can be calculated (and stored). (Step 66). A fringe pattern can be obtained for a second channel and the fringe pattern can be analyzed to measure an angle (Step 68, 70). Typically, the first and second channel are part of a stereoscopic endoscope.

An angle difference between the angle of the first channel and the angle of the second channel can be calculated. (Step 72). Finally, a diopter difference between the first channel and the second channel can be calculated. (Step 74). Thereafter, if the diopter difference is determined to be unacceptable, a user can perform maintenance on the stereoscopic endoscope to correct for the diopter difference or reject the stereoscope as being unacceptable.

In one specific method of testing a stereoscopic endoscope, the present invention comprises providing a laser source and expanding a laser beam through a beam expander so that the laser beam is large enough to enter both entrance pupils of a tip of the endoscope. The laser beam has parallel light rays, but when passing through the channels of the endoscope, the optics of the endoscope act like a negative lens which cause the laser beam rays to diverge.

At the other end of the endoscope, the end where the camera would normally be located, a compensator lens can be positioned to compensate for the effect of the "negative lens" effect of the endoscope's optics so as to bring the diverging laser light rays back to being parallel light. For example, if the optics of the endoscope are −0.8 diopters, the compensator lens will be ±0.8 diopters. After passing through the compensator lens, the parallel rays of light can hit shear plate 46.

Figure 6:
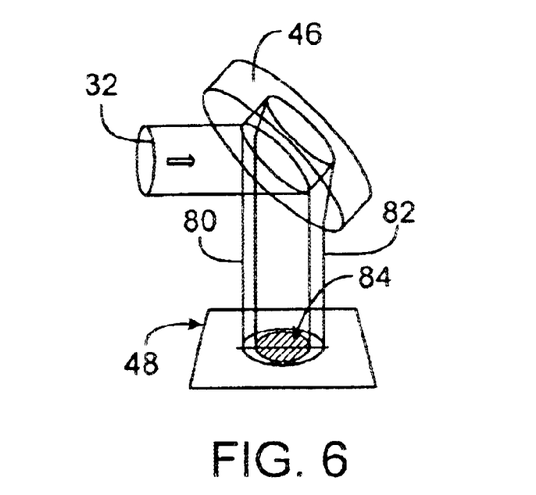
FIG. 6 illustrates a simplified shear plate of the present invention.

In exemplary embodiments, shear plate 46 is a piece of glass with two nearly parallel surfaces. As shown in FIG. 6, in one configuration, two nearly parallel surfaces are designed with a non-parallel specification. In one exemplary configuration, the surfaces have a wedge angle of 2 minutes of arc ±30 seconds. Laser light 32 can reflect off of a first, front surface 76 and then off of a second, back surface 78. Two reflected beams 80, 82 can interfere with each other, and when viewed by camera 48 (with filter), the reflected light appears as an interference fringe pattern 84 that has straight line segments. The angle of the straight line segments varies with the diopters of the endoscope lens, the diopters of the compensator lens, the non-parallel glass plates of the shear plate, and the angle of the camera relative to the beam.

If identical shear plates, identical compensator lenses, and identical camera orientations are used, then the difference in the angle of the left channel relative to the right channel would be a function of the diopters mismatch between the left channel and the right channels of the stereoscopic endoscope.

The shear plate can be mounted on a movable support, such as a movable vertical post (e.g., raised or lowered) so as to intercept the left channel beam or the right channel beam.

The camera can also be positioned on a movable support, such as a movable vertical post that allows the camera to be moved (e.g., raised or lowered) so as to intercept the left channel beam or the right channel beam. In preferred embodiments, the camera can be moved without rotating the camera. Generally, it is only possible to see one channel fringe patter at a time. Thus, once one fringe pattern is imaged from one channel, the camera can be moved to capture the fringe pattern from the other channel.

In one method, the camera and shear plate are positioned to view the fringe pattern of the left channel. The image is frame grabbed by a computer for analysis of the angle of the fringe lines relative to the camera frame. Software running on the computer can determine the angle of the fringe pattern using several signal processing steps.

One exemplary signal processing method is as follows, since the image is noisy and not well defined, the image can be frame grabbed a plurality of times (e.g., 2 times, 4 times, 8 times, 16 times, or the like), and the average of the plurality of images is used as a new image for further processing. The new image helps provide repeatable measurements.

The new image can be enhanced using standard gamma corrections to enhance the contrast ratio of the black and white image. This can help make the angle measurement insensitive to the brightness of the image.

The area of the image to be analyzed is generally the center area with the most line segments. The software determines this location by taking the frame grabbed image and scanning the image vertically from top to bottom along a vertical scan line that is one pixel wide. The line profile for the number of transitions of light-to-dark is examined. Then the software can move five pixels to the right and scan the next vertical portion of the image. This process is continued until the whole image has been scanned. The location on the image with the highest number of light-to-dark transitions is defined as the center of the image where the analysis of the line angle will next be done.

The software can then take one vertical scan down the center of the analysis zone and determine the vertical coordinate for each dark line segment found. The fringe lines are expected to be oriented nearly horizontally.

At each coordinate point the computer can determine the exact angle of the dark line segment. This angle can be determined by scanning the image with a straight, horizontal line scan (about 150 pixels long) with the line scan passing through the vertical coordinate, and each scan is at a different horizontal rotation angle. For example, if the fringe lines are horizontal, and the image is scanned slightly off from horizontal, the scan line profile will show variations of light to dark, as the scan line crosses the fringe line patterns. If however, the angle of the scan line exactly matches the angle of the fringe line, the line profile will always be the same dark pattern value. Dark pixel values have low numeric intensities and bright pixels have high pixel intensity values. The one scan line profile which has the smallest standard deviation, is defined as the angle of the fringe line. The method of finding the line scan with the lowest standard deviation works well with fuzzy or noisy images to give repeatable images.

The software can then process the next coordinate and compute the angle of that fringe line. Since the fringe pattern is noisy and not well defined, taking the average of three to four angles provides more repeatable measurements.

Figure 7A:
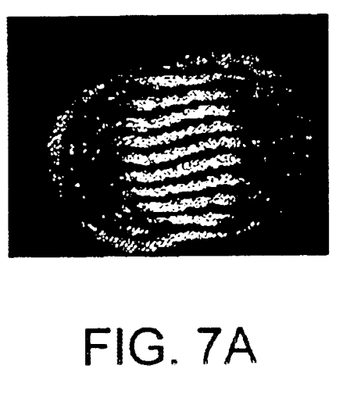
FIGS. 7A and 7B illustrates a fringe patterns from a left channel and a right channel, respectively.
Figure 7B:
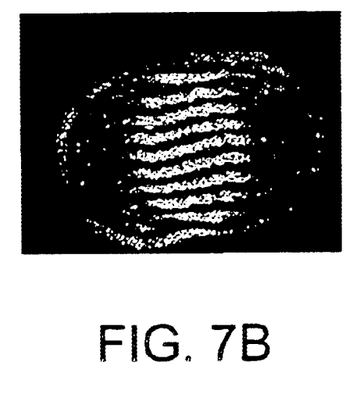

After the fringe pattern in the left channel is measured, the camera and shear plate (or the endoscope) can be moved to measure the right channel fringe pattern. FIGS. 7A and 7B illustrate some samples of fringe patterns of a left channel and a right channel, respectively. Once again the image can be analyzed to determine the angle of the fringe pattern, as described above, or with other conventional or proprietary methods. The computer can then determine the difference in the angles of the left image relative to the right image, where the difference is defined by:

Difference=Left Image Angle−Right Image Angle

By knowing the relationship of the angle difference to diopters-mismatch, the diopters mismatch of the scope can be calculated. It has been determined that the relationship of the angle-to-diopters relationship is a linear relationship. The relationship between the difference in angle and the diopters difference is a function of the shear plate wedge angle. Thus the shear plate should be calibrated. Alternatively, the relationship can be measured experimentally by removing the compensator lens when measuring just one channel and measuring the resultant angle difference caused by the known compensator lens (e.g., ±0.8 diopter). For the one stereoscopic endoscope tested, the Diopters Difference was defined by the following equation:

Diopters Difference=Angle Difference*(0.833)/40.45° where Diopters Difference is in units of 1/meters and the Angle Difference is in units of degrees. For the above calculation the 0.833 corresponds to a diopters of a compensator lens having a focal length of 1.2 meters and the 40.45° degrees corresponds to the difference in angle with and without the compensator lens. It should be appreciated however, that the Diopters Difference formula will vary depending on the actual wedge angle of the shear plate and the wavelengths of the laser.

If it is determined that the diopters difference is within an acceptable range, the computer can inform the user that the stereoscopic endoscope is properly focused. If however, the stereoscopic endoscope is determined to be out of focus, typically beyond ±0.2 diopters difference, the computer can indicate to the user that the stereoscopic endoscope is out of focus and the stereoscopic endoscope can be returned to the supplier.

While all the above is a complete description of the preferred embodiments of the inventions, various alternatives, modifications, and equivalents may be used. Although the foregoing invention has been described in detail for purposes of clarity of understanding, it will be obvious that certain modifications may be practiced within the scope of the appended claims.

What is claimed is:

1. A method of calibrating a first channel and a second channel of a stereoscopic imaging device, the method comprising:

comparing an angle of a straight line segment of a fringe pattern obtained from the first channel with an angle of a straight line segment of a fringe pattern obtained from the second channel to determine an angle difference between the first channel and second channel; and using the angle difference to calculate a diopter difference between the first and second channel.

2. The method of claim 1 comprising:

obtaining the fringe pattern of the first channel by delivering a laser beam through the first channel and reflecting the laser beam after it exits the first channel off of a shear plate so as to create the fringe pattern;

measuring the angle of the straight line segment of the fringe pattern of the first channel;

obtaining the fringe pattern of the second channel by delivering the laser beam through the second channel and reflecting the laser beam after it exits the first channel off of the shear plate so as to create the fringe pattern on the camera; and measuring the angle of the straight line segment of the fringe pattern of the second channel.

3. The method of claim 2 comprising moving the shear plate and the camera from a first position to a second position, wherein in; the first position the shear plate and camera receive a laser beam light from the first channel and wherein in the second position the shear plate and camera receive the laser beam light from the second channel.

4. The method of claim 2 comprising expanding the laser beam such that the laser beam has a cross section that is large enough to simultaneously enter the first and second channel.

5. The method of claim 2 comprising moving the stereoscopic imaging device from a first position to a second position, wherein in the first position the stereoscopic imaging device is positioned so that the laser beam enters only the first channel, and wherein in the second position the imaging device is positioned such that the laser beam enters only the second channel.

6. The method of claim 2 comprising positioning a compensator lens to compensate for an optical assembly of the first channel and second channel such that a laser beam exiting the first channel and second channel is collimated.

7. The method of claim 2 wherein obtaining the fringe pattern comprises reflecting the fringe pattern from the shear plate onto an image capture device to capture at least one image of the fringe pattern, and wherein measuring comprises signal processing the image(s) of the fringe pattern.

8. The method of claim 1 wherein using the angle difference comprises applying a linear equation to the angle difference to calculate the diopter difference.

9. The method of claim 1 wherein the stereoscopic imaging device is a stereoscopic endoscope.

10. A method for calibrating a stereoscopic endoscope, the endoscope comprising a first channel and a second channel, wherein the first channel and second channel each comprise a first end and a second end, the method comprising:
    delivering a laser beam into at least one of the first ends of the of the first and second channel so as to emit light through at least one of the second ends of the first channel and second channel;
    reflecting the light that exits the second end of the first channel and the second channel off of a shear plate, wherein the shear plate create two beams of light that create a fringe pattern comprising straight line segments;
    measuring an angle of the straight line segments for the first channel and second channel; and
    comparing the measured angle of the first channel and the second channel to determine a diopter difference between the first channel and the second channel.

11. The method of claim 10 wherein measuring an angle comprises imaging the straight line segments of the first channel and second channel with a camera.

12. The method of claim 11 comprising placing a neutral density filter on the camera to reduce a brightness of the fringe pattern.

13. The method of claim 10 comprising expanding the laser beam so that the beam is large enough to simultaneously enter the first ends of both the first and second channel.

14. The method of claim 10 comprising positioning a compensator lens to collimate the light exiting the first channel and second channel.

15. The method of claim 10 comprising moving the shear plate between a first position and a second position,
    wherein the shear plate in the first position reflects light exiting the second end of the first channel, and
    wherein the shear plate in the second position reflects light exiting the second end of the second channel,
    wherein the fringe patterns for the first channel and second channel are created separately.

16. The method of claim 10 comprising providing a microscope lens assembly in an optical path of the laser beam before the laser beam enters the first end of the first channel and second channel.

17. A method of calibrating a stereoscopic imaging device, the stereoscopic imaging device comprising a first imaging channel and a second imaging channel, the method comprising:
    obtaining a fringe pattern for the first imaging channel;
    calculating an angle of a straight line segment of the fringe pattern for the first imaging channel;
    obtaining a fringe pattern for the second imaging channel;
    calculating an angle for a straight line segment of the fringe pattern for the second imaging channel;
    comparing the angles of the first imaging channel and second imaging channel; and
    calculating a diopter difference between the first imaging channel and the second imaging channel from the comparison of the angles.

18. The method of claim 17 wherein obtaining a fringe pattern for the first imaging channel comprises directing a laser beam through the first imaging channel and reflecting the laser beam off of a shear plate and onto a camera, and
    wherein obtaining a fringe pattern for the second imaging channel comprises directing the laser beam through the second imaging channel and reflecting the laser beam off of the shear plate and onto the camera.

19. The method of claim 18 comprising moving the shear plate and camera from a first position to a second position, in the first position the shear plate and camera intercept the laser beam from the first imaging channel, in the second position the shear plate and camera intercept the laser beam exiting the second imaging channel.

20. The method of claim 18 comprising moving the stereoscopic imaging device so that only one of the first and second imaging channels is in the path of the laser beam.

21. The method of claim 18 comprising expanding the laser beam so that the laser beam is simultaneously directed through the first imaging channel and the second imaging channel.

22. A method of focusing a stereoscopic endoscope, the method comprising:
    providing a stereoscopic endoscope comprising a left channel and a right channel;
    delivering a laser beam comprising a cross-section large enough to enter both the left channel and right channel, wherein an optical assembly of the first channel and second channel causes the laser beam to diverge;
    compensating light that exits the left channel and right channel to collimate the light;
    creating a fringe pattern for the left channel and right channel by reflecting the collimated light off of a shear plate, wherein the fringe pattern comprises straight line segments that define angles which varies with a diopter of the light; and
    comparing the angles of the left channel and right channel, wherein a difference in the angles of the straight line segments of the left channel and right channel are used to calculate a diopter mismatch between the left channel and right channel.

23. The method of claim 22 wherein delivering a laser beam comprises expanding the laser beam from a first cross section to the cross section that is large enough to enter both the first and second channels.

24. The method of claim 22 wherein a diopter mismatch of ±0.2 diopters is deemed to be matching.

25. A system for calibrating a stereoscopic imaging device, the imaging devices comprising a first channel comprising a first end, a second end, and an optical assembly between the first end and the second end, and a second channel comprising a first end, a second end, and an optical assembly between the first end and the second end, the system comprising:
- a laser that generates a laser beam along an optical axis, the laser beam enters at least one of the first ends of the first channel and second channel and through the optical assemblies;
- at least one compensator lens positioned adjacent the second end of the first channel and right channel, wherein the compensator lens collimates diverging light that exits the second ends;
- at least one shear plate positioned to receive the collimated light after it exits the compensator lens, wherein the shear plate creates for the first channel and second channel an interference fringe pattern comprising straight line segments that define an angle that varies with a diopter of the optical assemblies of the first channel and second channel, wherein a difference in the angles of the straight line segments of the first channel and second channel is used to calculate a diopter mismatch between the first channel and second channel.

26. The system of claim 25 comprising a beam expander positioned within the optical axis of the laser beam which expands the laser beam so that the laser beam is delivered simultaneously into the first ends of the first channel and second channel.

27. The system of claim 26 comprising an objective lens positioned in the optical axis of the laser beam between the beam expander and the first end of the first channel and second channel.

28. The system of claim 25 comprising:
- at least one camera that obtains an image of the fringe pattern of the first channel and second channel; and
- a computer system coupled to the at least one camera that can analyze the image of the fringe pattern to calculate the angle of the fringe pattern for the first channel and second channel.

29. The system of claim 28 wherein the camera comprises a neutral density filter.

30. The system of claim 28 wherein the computer system comprises frame grabbing software to grab at least one image of the fringe patterns.

31. The system of claim 28 wherein the at least one shear plate comprises only one shear plate and the at least one camera comprises only one camera, wherein the shear plate and camera are movable to allow for independent analysis of the fringe pattern for the first channel and second channel.

32. The system of claim 31 wherein the shear plate and camera are each positioned on movable positioning devices.

33. The system of claim 25 wherein the stereoscopic imaging device is a stereoscopic endoscope.

34. The system of claim 33 wherein the stereoscopic endoscope is a Scholly endoscope.

35. A device for calibrating a stereoscopic endoscope, having a first channel and a second channel, the device comprising:
- a laser source that delivers a laser beam along an optical axis and into at least one of the first channel and second channel;
- a fringe pattern device that generates a fringe pattern from light that exits the first channel and second channel;
- an image device that captures at least one image of the fringe patterns; and
- a controller assembly that is configured to calculate an angle of the fringe pattern, determine an angle difference of the fringe patterns, and determine a diopter difference between the first channel and second channel using the angle difference.

36. The device of claim 35 comprising a collimating lens to collimate the light that exits the first and second channel.

37. The device of claim 35 comprising a beam expander that expands the laser beam so that the laser beam enters both the first channel and second channel.

38. The device of claim 35 comprising a movable support device coupled to the fringe pattern device and image device, wherein the fringe pattern device and image device are movable so as to be able to separately capture the fringe pattern from the first channel and second channel.

39. The device of claim 35 wherein the fringe pattern device is a shear plate.

40. A kit for focus matching a first channel and a second channel of a stereoscopic imaging device, the kit comprising:
- a laser source that generates a laser beam;
- a shear plate that reflects light exiting at least one of the first channel and second channel and creates a fringe pattern from the reflected light from the first channel and second channel;
- a camera that obtains an image of the fringe patterns for the first channel and second channel; and
- a computer system that compares angles of the fringe patterns of the first channel and second channel and calculates a diopter difference between the first channel and the second channel.

41. The kit of claim 40 comprising a beam expander that expands the beam so that the laser beam has a cross-sectional size that is large enough to simultaneously enter both the first channel and second channel.

42. The kit of claim 40 comprising a neutral density filter that reduces a brightness of the fringe pattern.

43. The kit of claim 40 comprising a collimating lens that collimates light that exits the first channel and second channel.

44. The kit of claim 40 comprising a movable support device for the camera and shear plate that moves the camera and shear plate from a first position to a second position, wherein the movable support device can position the shear plate and camera in the first position captures light and the fringe pattern from the first channel and the shear plate and camera in the second position captures light and the fringe pattern from the second channel.

* * * * *